Figure 1:
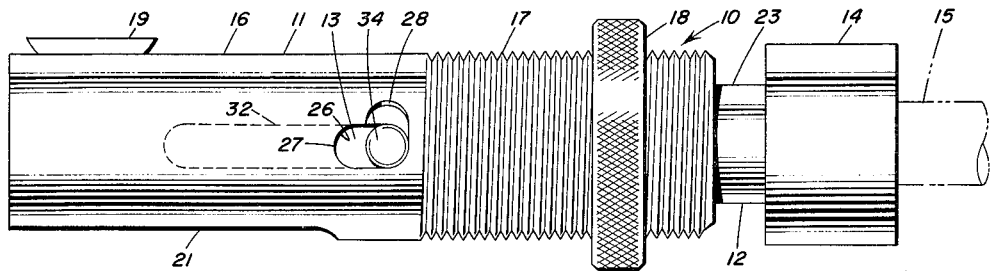

Nov. 30, 1965    E. P. SUPERNOR    3,220,031

TAP HOLDER

Filed Aug. 29, 1963

EUGENE P. SUPERNOR
INVENTOR

BY

ATTORNEY

3,220,031
TAP HOLDER
Eugene P. Supernor, Worcester, Mass., assignor to The Heald Machine Company, Worcester, Mass., a corporation of Delaware
Filed Aug. 29, 1963, Ser. No. 305,440
4 Claims. (Cl. 10—129)

This invention relates to a tap holder and, more particularly, to apparatus arranged to be interposed between a machine tool drive and a tap during the threading of a bore in a workpiece.

It is general practice, in the process of using a tap in a machine tool, to hold the tap in a so-called "tap holder" and to insert the tap holder in the chuck of the machine tool for driving action. The machine tool advances the tool holder and tap toward the bore which is to be threaded and, at the same time rotates it, so that, when the tap enters the bore, it generates a thread. Because of the fact that a tap is self-feeding, it is practically impossible to arrange the feed of the machine tool so that it is exactly the same as the feed rate of the tap. The tool holder, therefore, is usually constructed to compensate for the difference between the advance speed of the machine tool chuck and the advance and retreat speed of the tap. It is necessary, however, when the tap first strikes the bore, that considerable pressure be brought to start the threading operation. Once the threading has started, it is only necessary to rotate the tap and it feeds itself into the bore automatically. In the past, because tap holders have been constructed to permit the tap to retract, it has been difficult for the tap to bite into the metal in the bore, there being insufficient pressure between the front end of the tap and the outer edge of the bore. Furthermore, when the machine tool is reversed and the tap is threaded out of the bore when the work is completed, the tap rises out of the hole faster than the machine tool feeds away from the hole, so that the tap holder must also provide for this difference in movement. These and other difficulties experienced with the prior art devices have been obviated in a novel manner by the present invention.

It is, therefore, an outstanding object of the invention to provide a tap holder in which the tap is locked against movement relative to the tap holder until such time as the tap has started the threading operation.

Another object of this invention is the provision of a tap holder capable of pressing the tap against the opening to the bore with considerable force at the start of a threading operation.

A further object of the present invention is the provision of a tap holder which is capable of automatically compensating for differences in feed rate of a tap relative to the feed rate of the machine tool with which it is used.

It is another object of the instant invention to provide a tap holder which is simple in construction, which may be easily manufactured from readily-obtained materials with relatively unskilled labor, and which is capable of a long life of useful service.

With these and other objects in view, as will be apparent to those skilled in the art, the invention resides in the combination of parts set forth in the specification and covered by the claims appended hereto.

Figure 2:
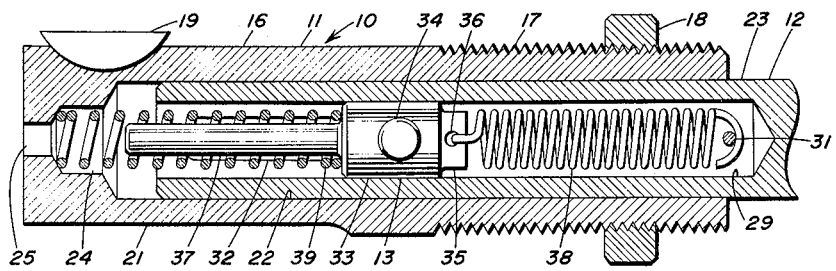
Figure 3:
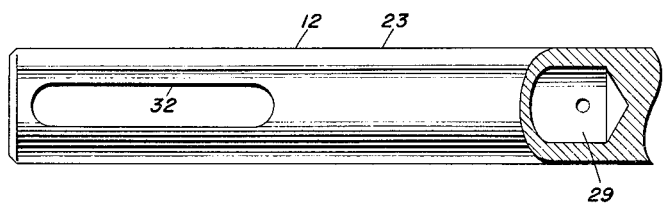
Figure 4:
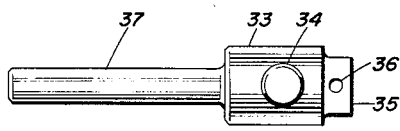
Figure 5:
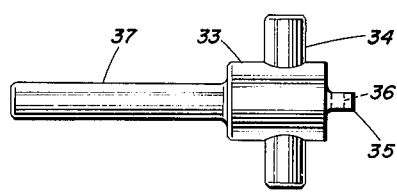

The character of the invention, however, may be best understood by reference to one of its structural forms, as illustrated by the accompanying drawings in which:

FIG. 1 is a plan view of a tap holder embodying the principles of the present invention, FIG. 2 is a longitudinal sectional view of the invention taken on a horizontal plane, FIG. 3 is a plan view of a portion of the invention, FIG. 4 is a plan view of another portion of the invention, and FIG. 5 is an elevational view of the portion shown in FIG. 4.

Referring first to FIG. 1, which best shows the general features of the invention, a tap holder, indicated generally by the reference numeral 10, is shown as consisting of an outer body 11, an inner body 12, and a retainer 13. The inner body 12 extends outwardly of the outer body 11 and is provided with a collet 14 in which is mounted a tap 15.

The outer member 11 is provided with a generally cylindrical outer surface 16, which is provided with a threaded portion 17 on which is threadedly mounted a locking collar 18. It is also provided with a key 19 on one side and a tapered flat 21 on the side opposite the key. The outer body 11 is also provided with a cylindrical bore 22 and the inner body is provided with an outer cylindrical surface 23 which fits snugly within the bore 22 and permits the inner member to slide longitudinally relative to the outer body 11. The bore 22 in the outer body 11 extends inwardly from one end and at the other end is joined to a reduced counterbore 24 which, in turn, leads through a reduced passage 25 to the exterior of the other end of the body. Extending from the bore 22 through the wall of the outer body are two oppositely-arranged slots 26. The slot 26 is generally L-shaped and is provided with one arm 27 which extends longitudinally of the outer body and with another arm 28 which extends at a right angle to the axis of the body. The junction of the arms is located toward the end to which the tap 15 is attached.

Referring to FIG. 2, it can be seen that the inner body 12 is provided with a bore 29 which enters the end which lies within the outer body 11 but terminates short of the other end. The retainer 13 is slidably carried in the bore 29. A pin 31 extends across the inner end of the bore 29.

Referring to FIG. 3, it can be seen that the inner member 12 is provided with an elongated slot 32 extending between the bore 29 and the outer surface 23.

FIGS. 4 and 5 show that the retainer 13 is provided with a head 33 in the general form of a cylinder which would fit slidably in the bore 29 and which has been provided with flats. Extending from the flats on either side is a pin 34. From the end of the head 33 facing the tap extends a finger 35 having a small aperture 36 and from the other end of the head extends a rod 37.

Returning again to FIG. 2, it can be seen that a coil spring 38 extends between the pin 31 and the aperture 36 and is normally under tension. A coil spring 39 extends between the head 33 of the retainer 13 and a shoulder at the bottom of the counterbore 24, this spring being normally under compression.

The operation of the apparatus will now be readily understood in view of the above description. In operation, the tap 15 is inserted and locked in the collet 14, while the other end of the outer body 11 is inserted in the chuck of the machine tool. The key 19 registers with a slot in the chuck and the tapered flat 21 is used to lock the tap holder in place. The collar 18 is then used to further lock the tap holder in the chuck of the machine tool. The workpiece is placed in alignment with the tap and the machine tool is advanced so that the tap approaches the bore to be threaded. In the meanwhile, the machine tool rotates the tap holder also. Now, the moment that the tap 15 strikes the bore in the workpiece, the friction between the tap and the workpiece causes the inner body 12 to lag behind the outer body 11. The inner body 12 carries the retainer 13 with it so that the pin 34 is thrown into the leg 28 of the slot 26.

It should be noted that, in the neutral position (that is to say, without any axial force on the tap 15) the pin resides in the right-hand end of the slot 32 of the inner body 12 and resides in the corner or intersection of the L-shaped slot 26, as is shown in FIG. 1. Shortly after the tap 15 is slowed down by frictional engagement with the edge of the bore which is to be threaded and the pin 13 is moved into the leg 28 of the slot, the tap strikes the workpiece with considerable force and considerable axial thrust is received on the tap 15. However, since the pin 34 is residing in the leg 28, it is impossible for the inner member 12 (which carries the tap 15) to move axially into the outer body 11. This means that the inner body 12 and the outer body 11 do not telescope but, in effect, constitute a solid bar, so that the entire feed force of the machine tool is brought to bear between the tap 15 and the workpiece. This permits the tap to start the threading of the hole and it prevents any relative slipping of the tap over the edge of the bore. In other words, this extremely stiff, high force between the tap and the workpiece causes the threading to start immediately. Once the threading has been started, however, the tap 15 proceeds to move axially into the bore faster than the machine tool feeds the tap holder 10. This axial pulling of the tap by the workpiece during the formation of the thread causes the inner member 12 to move telescopically out of the outer body 11. The inner body attempts to carry the retainer 13 with it, but the pin 34 strikes the forward edge of the slot 26 so that the retainer stays behind and the slot 32 moves relative to the pin 34. For a very deep hole, the pin 34 may eventually reside in the left-hand end of the slot 32. At some time, however, the machine tool will be reversed to thread the tap out of the threaded bore. When this is done, the inner body 12 begins to move back into the outer body 11 and the position of the pin 34 relative to the slot 32 begins to move toward the right-hand end. As a matter of fact, in many cases the slot will reach such a position that the pin is in the extreme right-hand end and the tap is still moving the inner body 12 out of the workpiece faster than the machine tool is moving the outer body 11 away from the workpiece. When this happens, the surface of the right-hand end of the slot 32 of the inner body 12 will strike the pin 34 and carry it to the left against the tension spring pressure 38 and the compression spring pressure 39. This means that the pin 34 also moves relative to the outer body 11 and actually is allowed to move over into the arm 27 of the slot 26. As soon as the tap 15 is free of the workpiece, however, the relationship between the outer body 11 and the inner body 12 and the retainer 13 is determined solely by the springs 38 and 39, so that the pin will return to an intermediate position and will carry the inner body 12 with it so that the apparatus takes up the condition shown in FIG. 1. In other words, the leg 28 of the slot extends away from the direction of rotation of the holder body 11, so that relative rotation between the members 11 and 12 (when the tap engages the bore) causes the pin 34 to move into the leg portion 28. This locks the inner and outer members against longitudinal motion relative to one another and permits the application of the force necessary to start the tap. Upon reverse rotation of the holder, the inner member 12 and the pin 34 rotate relative to the body 11 so that the pin 34 is positioned for movement in the arm 27 of the slot. This permits the tap to feed out of the threaded hole faster than the retraction movement of the drill press or other machine in which the tap is used.

It can be seen, then, that by use of the present apparatus, it is possible to thread bores in a machine tool using a tap and providing for compensation in rate of feed between the tap and the machine tool proper. At the same time, a firm backing is provided for the tap at the moment of its first engagement with the bore and also for over-feed in the outward direction of the tap.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:
1. A tap holder, comprising
 (a) a tubular outer body adapted to be connected for rotation by a machine tool,
 (b) an elongated inner body slidably and rotatably mounted in the outer member and being adapted to be connected to a tap for forming a thread in a bore of a workpiece, and
 (c) a retainer mounted in a bore in the inner body for sliding movement longitudinally thereof for limiting sliding movement of the inner body into the outer body when the tap first engages the workpiece and permitting sliding movement of the inner body outwardly of the outer body when the tap is drawn into the workpiece as the thread is formed, the retainer having a transverse pin extending outwardly through a longitudinal slot in the outer body, the slot in the outer body being L-shaped and having one leg extending transversely and one leg extending longitudinally.
2. A tap holder as recited in claim 1, wherein means is provided for permitting sliding of the inner body into the outer body when the tap rotation is reversed, the sliding taking place past the normal position of the inner body within the outer body when the bodies are at rest.
3. A tap holder as recited in claim 1, wherein a spring is mounted in the bore in the inner body and operatively engages the retainer to cause the pin normally to occupy corresponding extreme ends of the slots.
4. A tap holder as recited in claim 3, wherein a tension spring connects the retainer with the inner body and lies within the bore and a compression spring lies in the bore and extends between the retainer and the outer body.

References Cited by the Examiner
UNITED STATES PATENTS 2,772,094 11/1956 Jamilkowski et al. _____ 10—129
2,848,239 8/1958 Benjamin et al.

FOREIGN PATENTS 489,624 10/1918 France.

ANDREW R. JUHASZ, *Primary Examiner.*